4 Sheets—Sheet 1.

F. O. TUCKER,

Assignor to NATIONAL STOP MOTION CO.

Weft-Stop Mechanism.

No. 8,632. Reissued Mar. 25, 1879.

*Witnesses*

Willard Eddy.

Thos. E. Kurz.

*Inventor*

Frederick O. Tucker by Theo. G. Ellis, Attorney.

N. PETERS, PHOTO-LITHOGRAPHER, WASHINGTON, D. C.

F. O. TUCKER,

Assignor to NATIONAL STOP MOTION CO.

Weft-Stop Mechanism.

No. 8,632. Reissued Mar. 25, 1879.

Witnesses

Willard Eddy

Thos. E. King.

Inventor

Frederick O. Tucker by Theo. G. Ellis, Attorney

N. PETERS, PHOTO-LITHOGRAPHER, WASHINGTON, D. C.

F. O. TUCKER,

Assignor to NATIONAL STOP MOTION CO.

Weft-Stop Mechanism.

No. 8,632. Reissued Mar. 25, 1879.

Witnesses

Willard Eddy.

Thos. E. King

Inventor

Frederick O. Tucker by Geo. G. Ellis, Attorney

N. PETERS, PHOTO-LITHOGRAPHER, WASHINGTON, D. C.

F. O. TUCKER,

Assignor to NATIONAL STOP MOTION CO.

Weft-Stop Mechanism.

No. 8,632. Reissued Mar. 25, 1879.

Witnesses
Willard Eddy.
Thos. E. King

Inventor
Frederick O. Tucker
by Theo. G. Ellis, Attorney

N. PETERS, PHOTO-LITHOGRAPHER, WASHINGTON, D. C.

UNITED STATES PATENT OFFICE.

FREDERICK O. TUCKER, OF HARTFORD, CONNECTICUT, ASSIGNOR TO NATIONAL STOP MOTION COMPANY, OF WESTERLY, RHODE ISLAND.

IMPROVEMENT IN WEFT-STOP MECHANISMS.

Specification forming part of Letters Patent No. 174,928, dated March 21, 1876; Reissue No. 8,632, dated March 25, 1879; application filed September 23, 1878.

*To all whom it may concern:*

Be it known that I, FREDERICK O. TUCKER, of Hartford, in the county of Hartford and State of Connecticut, have invented certain new and useful Improvements in Weft-Stop Motions for Looms; and I do hereby declare that the following is a full, clear, and exact description thereof, whereby a person skilled in the art can make and use the same, reference being had to the accompanying drawings, and to the letters of reference marked thereon.

Like letters in the figures indicate the same parts.

Figure 1:
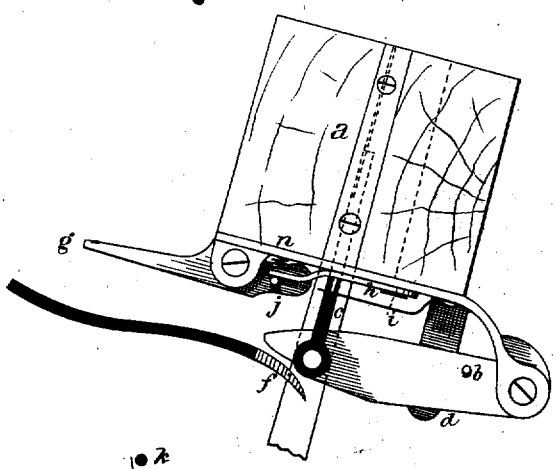
Figure 3:
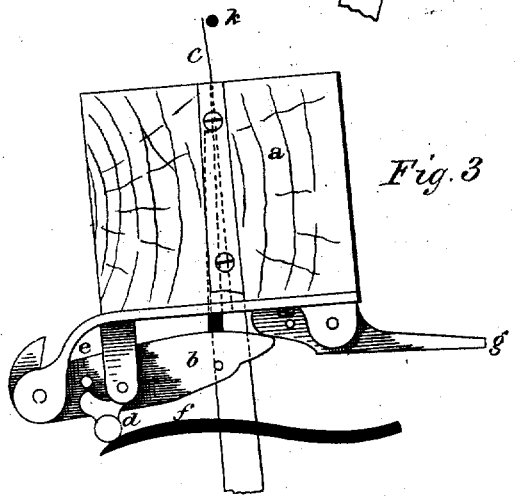
Figure 2:
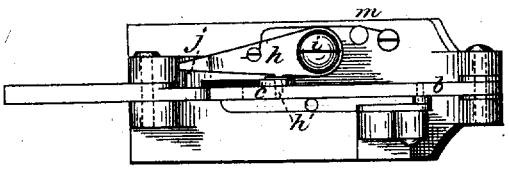
Figure 4:
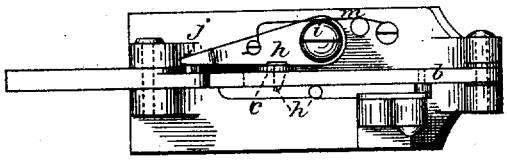
Figure 5:
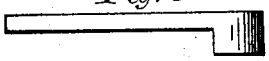

Figure 1 is a side view of the operating parts when the lathe-beam is at the rear limit of its play and the weft-thread is absent. Fig. 2 is a bottom view of the same. Fig. 3 is a side view of the same parts from the opposite side, the dog just mounting the stationary cam. Fig. 4 is a bottom view of the same as Fig. 2, except that the rear end of the dagger is locked. Fig. 5 is a top view of the stationary cam. Figs. 6, 7, 8, and 9 are views of modifications, and will be hereinafter referred to.

The letter *a* denotes the lathe-beam; *b*, lever pivoted thereunder; *c*, comb of wires pivoted to the lever *b*, and reciprocating through the lathe-beam; *d*, a dog pivoted to the side of the lever *b*, and so acting, in conjunction with the pin *e*, that when the lathe-beam swings forward, this dog mounts the cam *f*, attached to the breast-beam, and lifts the free end of the lever *b*.

*g* denotes a pivoted dagger, the rear end of which is raised, and the front end correspondingly lowered, by the upward movement of the lever *b*, as shown in Fig. 3; *h*, a locking-piece pivoted on the pin *i*, which rests in its normal position (shown in Fig. 2) when the lever *b* first lifts the rear end of the dagger, but which is swung into the position shown in Fig. 4 as the lathe-beam moves farther forward, provided the weft-thread is right and unbroken, by the comb *c* striking against the arm *h'* in such position, swinging its front end under the pin *j*, and thus holding the front end of the dagger locked in its lowest position.

The letter *k* denotes the weft-thread on which the comb operates.

Supposing the weft-thread to be in its proper place and unbroken, the operation of the parts during a complete back-and-forth vibration of the lathe, starting from the rear limit of its play, is as follows: As the lathe swings forward, the dog *d* mounts the cam *f* and lifts the free end of the lever *b*, which strikes and raises the rear end of the dagger *g*, correspondingly depressing the forward end, so that it will not strike and operate the belt-shifting mechanism, and thereby stop the loom.

As the lathe moves farther forward, the upper end of the comb *c* strikes the fresh weft-thread *k*, and the effect thereof is to hold the comb stationary, so to speak, while the lathe moves forward, causing the arm *h'* (shown in dotted lines in Figs. 1 and 2) to strike against the comb, and thereby swing the front end of the locking-piece under the pin *j*, which is on the dagger, and hold the dagger with its front end locked down. When the lathe swings backward, the dog *d* returns over the stationary cam without lifting the lever *b*. All this time—that is, during the movement from front to rear—the dagger remains thus locked; but the moment, on the swing from rear to front, that the lever *b* moves upward, it lifts the pin *j* off the locking-piece *h*, which then, actuated by the spring *m*, moves to the position shown in Fig. 2, and thereby unlocks the dagger. The spring *n* throws the front end of the dagger up when not prevented.

If, as the lathe moves farther forward, the fresh weft-thread is found broken, and does not arrest the upper end of the comb, the locking-piece *h* is not swung into locking position, so that when the lever *b* falls the front end of the dagger flies upward, and, at the forward limit of the play of the lathe, strikes the shipping mechanism by old methods and stops the loom.

Figure 7:
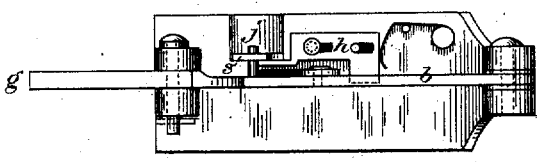
Figure 6:
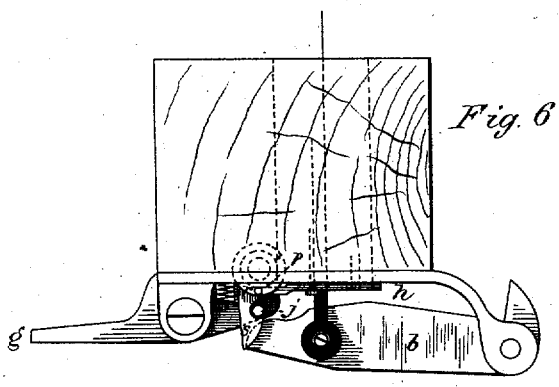

Fig. 6 is a side view of a modification of my improvement, and Fig. 7 is a bottom view of the same. The operation of the parts is the same as just described, except that, in place of swinging on a pivot, the locking-piece reciprocates in a right line with the movement of the comb, and, by means of the pin *p*, gives corresponding rotary reciprocation to the disk *r* and its hook *s*, which acts in connection with the pin *j*.

Figure 9:
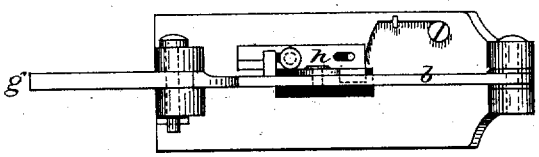
Figure 8:
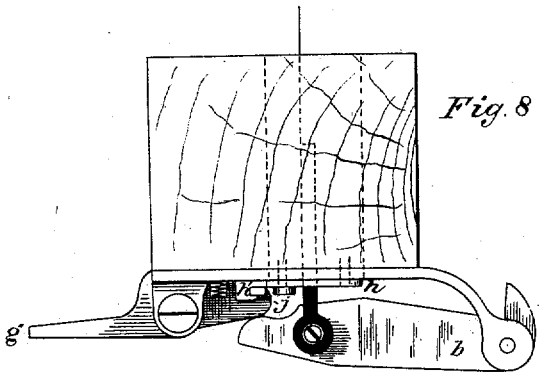

Fig. 8 is a side view of another modification. Fig. 9 is a bottom view of the same. Here the locking-piece slides as in the last modification described, but has upon it a hook, *h'*, which operates in connection with the pin *j*.

What I claim as my invention is—

1. The combination, with the dagger *g*, of the locking-piece *h*, the comb *c*, the lever *b*, and mechanism for operating said lever, substantially as described.

2. The combination of the lever *b*, the comb *c*, the locking-piece *h*, and the spring *m*, substantially as described.

FREDERICK O. TUCKER.

Witnesses:

THEO. G. ELLIS,

THOMAS VINCENT.